UNITED STATES PATENT OFFICE.

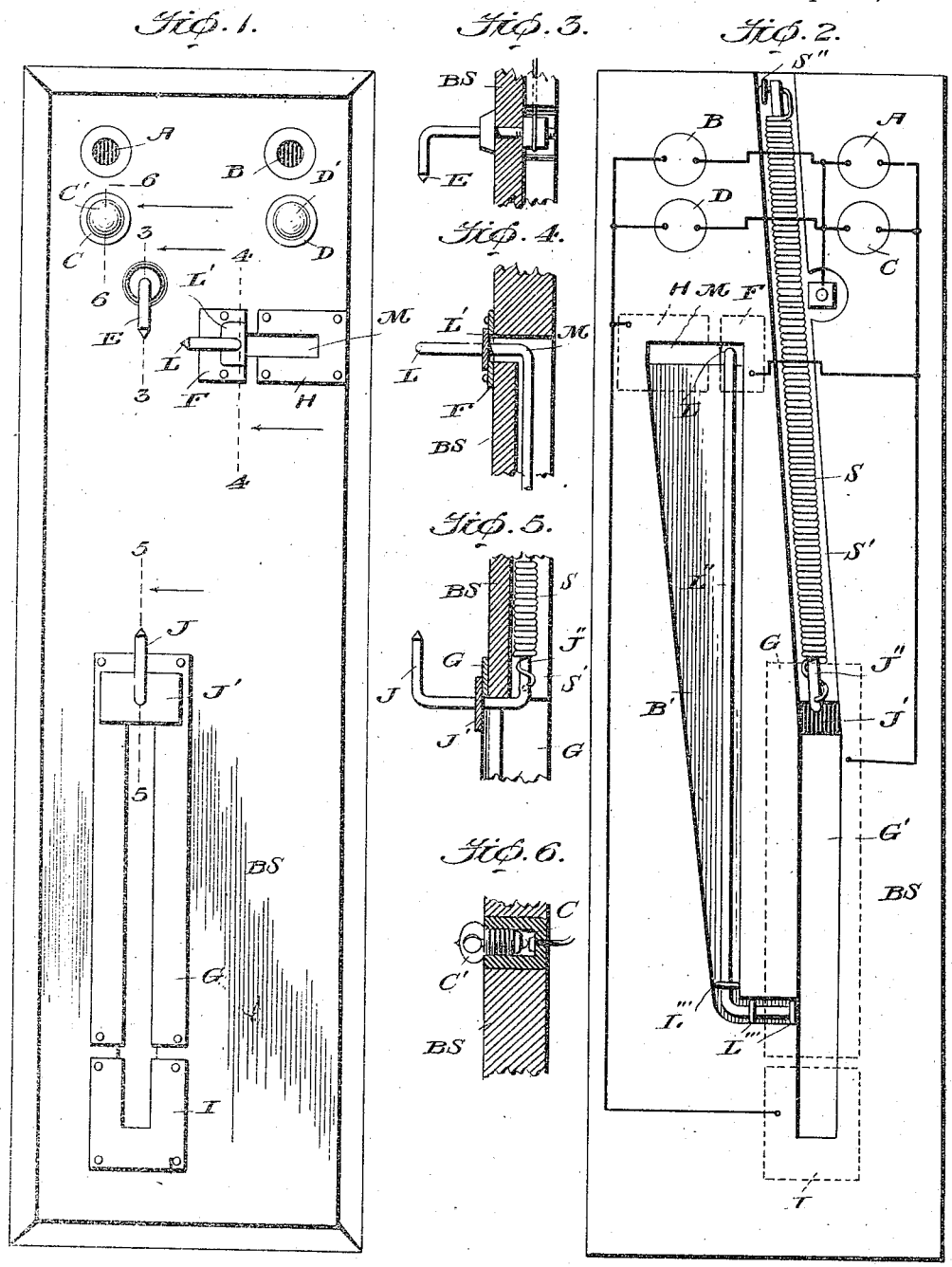

WILLIAM F. CASS, OF ESCANABA, MICHIGAN, ASSIGNOR OF ONE-HALF TO LOUIS N. SCHEMMEL, OF ESCANABA, MICHIGAN.

BATTERY AND LAMP TESTER.

1,179,502.  Specification of Letters Patent.  Patented Apr. 18, 1916.

Application filed March 27, 1915. Serial No. 17,388.

*To all whom it may concern:*

Be it known that I, WILLIAM F. CASS, a citizen of the United States, residing at Escanaba, in the county of Delta and State of Michigan, have invented certain new and useful Improvements in Battery and Lamp Testers, of which the following is a specification.

This invention relates to battery and lamp testers.

The ordinary "dry" batteries commonly used for pocket or other flash lights, are put up in sealed packages or cartons and sold to the dealer with the understanding that if, within a stated period, they deteriorate on the stock shelf without being used, they will be replaced by fresh batteries by the manufacturers, provided the seals on the cartons are unbroken. To permit testing of these batteries, it is a common expedient to provide small openings in the cartons to afford access to the battery elements so that they may be included in the testing circuit. These batteries come in various sizes and shapes, some having the openings for application of the test device terminals in the top and bottom; others in the top and side. It becomes necessary in practice, therefore, to test batteries of different lengths and shapes and with differently arranged test openings in the cartons without breaking the seal of the carton. Flash light batteries and the lamps commonly used therewith are usually 2.5 to 3.5 volt capacity. Small flash light electric lamps are commonly sold by dealers who sell flash light batteries and it becomes necessary to test these lamps as well as to test the batteries, before selling them.

My invention has for its object the provision of a simple, inexpensive and reliable flash light battery and lamp tester adapted for rapid and easy testing of flash light battery cells whatever their size and shape and however the test openings in the cartons are arranged, and further, for the testing of flash light lamps, thus obviating the necessity of cumbersome cell testing methods which have heretofore been employed.

My invention contemplates the provision of relatively movable terminals arranged in a novel manner and having improved circuit connections whereby a flash light battery of any kind may be readily applied to the terminals and the flashing or non-flashing of a test lamp, combined with the circuits in an improved fashion, will signify whether the battery is of the requisite voltage or not.

The invention has for a further object the provision of the aforesaid novel and improved terminals and circuit arrangements together with sockets for the insertion of flash light lamps whereby they may be tested to determine whether they are of the requisite voltage.

I am aware that my invention is susceptible of modification and I have disclosed hereinafter and shown in the accompanying drawings, but one embodiment adapted to carry out the objects and principle thereof.

In the accompanying drawings:—Figure 1 is a front view; Fig. 2, a rear view; Fig. 3, a detail section on line 3—3, Fig. 1; Fig. 4, a detail section on line 4—4, Fig. 1; Fig. 5, a detail section on line 5—5, Fig. 1; and Fig. 6, a detail section on line 6—6, Fig. 1.

The parts of the conductors for the circuits are all carried by a base BS which may be of wood. In the base there are mounted or sunk four miniature base sockets A, B, C, D. The sockets A and B are blank sockets to permit the slipping thereinto and pulling out of the miniature lamps which are to be tested. The sockets C and D are screw sockets for the insertion of miniature test lamps C' and D'. The sockets A and C are for the accommodation of 2.5 volt lamps and the sockets B and D for 3.5 volt lamps. One terminal of each socket is connected to a metal pointed hook terminal E mounted on the base BS and pointing longitudinally thereof. The remaining terminals of the sockets A and C are connected by a suitable conductor to the metal plates F and G, the former being disposed at one side of the hook terminal E and the latter extending longitudinally of the base BS. The remaining terminals of the sockets B and D are connected by a suitable conductor to metal plates H and I constituting, respectively, continuations of the plates F and G, but disconnected therefrom.

Extending through the base BS is a slot G' which coincides with a corresponding slot in the plates G and I. A hook-shaped pointed contact terminal J which is in line with the hook shaped terminal E, has a base J' which is adapted to slide on the plates G and I. A rod J'' carries the hook J and contact plate J' and lies within a retracting spring S which is disposed in a slot S' in the back of the base BS and is anchored at S''. This spring tends to hold the hook terminal J in its raised position and to yieldingly hold it in engagement with the battery when the latter is inserted between the contact terminals E and J.

A pointed, hook-shaped contact terminal L having a contact terminal L' which is adapted to bear against the plates F and H has its shank extending through a slot M in base BS corresponding to slots in the plates F and H. A spring rod L'' carries the contact terminal L and the contact plate L', said rod being free to play in the recess B' in the back of the base BS and being secured to the base at L'''.

It is quite apparent that the means for spring-actuating the contact terminals J and L could be changed, the object being to have these terminals spring-pressed to hold them in engagement with the battery when it is inserted and to permit yielding adjustment to accommodate batteries of different shapes and sizes, without requiring clamping screws or nuts or other adjusting means. The employment of spring-actuating means renders these contacts J and L self or automatically yielding or adjustable. To test a 2.5 volt tubular battery, the pointed terminal J is inserted in the small hole in the lower part of the carton and the contact J is forced down against the action of spring S until the small hole in the top of the carton can be made to receive the pointed terminal E. The usual 2.5 volt battery is not long enough to force the terminal J below the contact plate G. Consequently, the circuit is completed from J to G, G to C, and A and through the 2.5 volt lamp C' which remains screwed in the socket C, to the terminal E and through the battery being tested. If the battery is in proper condition the 2.5 volt lamp C' will light.

To test a 3.5 tubular volt battery, the same principal operation is gone through with, but batteries of this voltage are of such a length that the hook J is forced down beyond the lower end of plate G and contact is broken with G and established through J' with plate I so that the circuit is then from the battery to I, thence to sockets D and B, to contact E and to the battery. If the battery is good, the 3.5 volt lamp D' in socket D will light.

When a 2.5 volt flat battery is to be tested, the contact terminal L is inserted in the hole in the side of the battery carton and the contact L is forced to one side against the action of spring L'' until the hole in the top of the carton can be made to receive the terminal E. A 2.5 volt flash light battery is not wide enough to force the hook L beyond the plate F. Contact is therefore made from the battery to hook L, thence to plate F and to sockets C and A and through 2.5 volt lamp C' to E. If the battery is good, the 2.5 battery lamp C' will light.

When a 3.5 volt flat battery is to be tested, the same operation is gone through with, but as 3.5 volt flat flash light batteries are of sufficient width to force the hook L past plate F, the contact plate L' then engages the plate H and the circuit is completed through L, L', H, D and B back to hook E, thereupon lighting the 3.5 volt lamp D' if the battery is good.

When a 2.5 flash light lamp is to be tested, a 2.5 volt flash light battery is placed between the hook terminals E and J. The spring S will hold the battery in place. The 2.5 volt lamps may be tested by simply pushing them, one at a time, into the blank-base socket A. If the lamps are good, they complete the circuit through the blank-base A and the lamp being tested is lighted. It is then removed and another inserted. The same operation is carried out for testing a 3.5 volt lamp except that a 3.5 volt tubular battery is used and the lamp is pushed into the blank-base socket B instead of the socket A.

With the present tester, flash light batteries of any kind and miniature lamps can be tested as fast as they can be handled, resulting in a large increase in speed and accuracy.

Having thus described my invention, what I claim as new and desire to secure by Letters Patent, is:—

1. In a battery tester, a base, contact terminals mounted thereon for bodily slidable movement in relation to each other to adapt them for relative adjustment to engage a battery to be tested, a test indicator mounted on said base, and circuit connections between the circuits and the test indicator.

2. In a battery tester, a base, a stationary contact terminal mounted thereon, a spring-retracted movable contact terminal mounted on said base, said terminals being adapted to engage a battery to be tested, a test indicator mounted on said base, and circuit connections between the terminals and the test indicator.

3. In a battery tester, relatively movable contact terminals adapted to engage a battery to be tested, two test indicators both electrically connected to one of the contact terminals aforesaid, and independent contacts respectively in circuit with the aforesaid test indicators and adapted to be independently engaged by the movable contact terminals, whereby one or the other of the test indicators may be included in circuit with the movable contact.

4. In a battery tester, a stationary contact terminal, a spring-retracted movable contact terminal, said terminals being adapted to engage a battery to be tested, two independent contacts with which the movable contact terminal is adapted to independently engage, one at a time, according to its position, independent test indicators in circuit with the stationary contact and with the respective independent contacts last-named, whereby one or the other of said test indicators will be placed in circuit with the contact terminals according to the position of the spring-retracted contact terminal.

5. In a battery tester, the combination with a base having a slot, of disconnected metallic plates at the ends of said slot, a slide movable in said slot in contact with one or the other of said plates, a terminal on said slide, a spring biasing said slide toward one end of said slot, a stationary terminal on said base, and indicators mounted on said base and connected with said stationary terminal and said plates.

6. In a battery tester, the combination with a base having a longitudinal slot and a slot at right angles thereto, disconnected metallic plates at the ends of said slots, a slide movable in each slot, a terminal on each slide, a spring biasing each slide toward one end of its slot, a stationary terminal mounted on said base, and indicators mounted on said base and connected with said stationary terminal and with said plates.

In testimony whereof I affix my signature in presence of two witnesses.

WILLIAM F. CASS.

Witnesses:
F. A. SAWALL,
R. A. KAMRATH.